April 7, 1931.  F. WALLACE  1,799,266

ANTISCALDING WATER MIXING VALVE

Filed Nov. 23, 1928

INVENTOR
Frank Wallace
BY E. F. Gennert
ATTORNEY

Patented Apr. 7, 1931

1,799,266

UNITED STATES PATENT OFFICE

FRANK WALLACE, OF FREEPORT, NEW YORK

ANTISCALDING WATER-MIXING VALVE

Application filed November 23, 1928. Serial No. 321,300.

This invention relates to certain new and useful improvements in anti-scalding water mixing valves, especially adapted for use for bath showers, shampoo sprays and the like and also in other connections and has for one of its objects to simplify the construction of such devices by providing an anti-scalding water mixing valve embodying comparatively few parts functioning to accomplish the purposes ascribed thereto.

Another object of the invention is to provide an anti-scalding water mixing valve of a nature to be inserted in existing standard plumbing systems or assembled in new installations by associating the mixing valve with the hot and cold water supply pipes.

With the above and other objects in view that will become apparent as the nature of the invention is better understood, the same consists in the novel form, combination and arrangement of parts hereinafter more fully described, shown in the accompanying drawing and claimed.

In the drawing:—
Figure 1 is a vertical longitudinal sectional view of the anti-scalding water mixing valve constructed in accordance with the present invention, showing the independently slidable plunger valves for the hot and cold water supply pipes on their seats and further showing by dotted lines, the plunger valves removed from their seats with separate outlets in the fitting or valve casing for hot and cold water;
Figure 2 is a cross-sectional view taken on line o—o of Figure 1;

Figures 1, 2, 3:
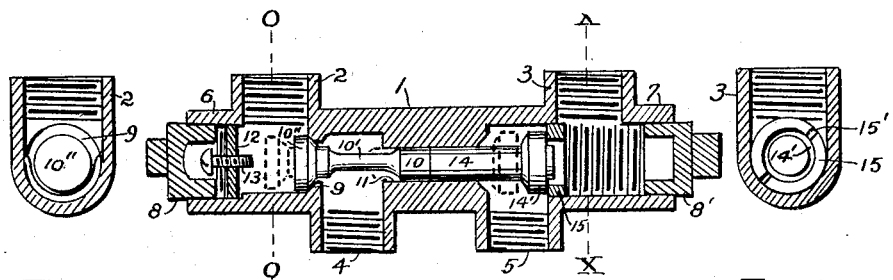
Figure 3 is a cross-sectional view taken on line x—x of Figure 1.
Figure 4:
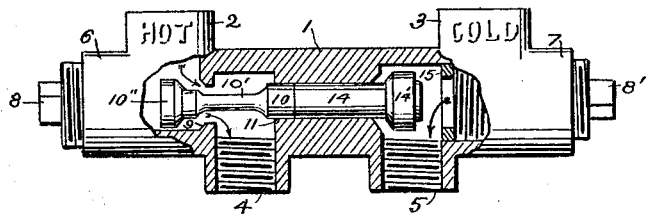
Figure 4 is a side elevational view, partly shown in section with the valves for the hot and cold water supply removed from their seats.

Referring more in detail to the accompanying drawing, there is illustrated a valve body 1 having valve controlled passages adjacent opposite ends thereof for controlling the flow of hot and cold water through the valve casing, one side of the casing having hot and cold water inlet connections 2 and 3 respectively at opposite ends thereof, while the other side of the mixing valve casing 1 has separate outlets 4 and 5 for hot and cold water respectively associated with the hot and cold water inlets 2 and 3, the outlets 4 and 5 being associated with a single pipe line, not shown, for accomplishing the mixing of hot and cold water flowing through the valve casing 1. The open ends 6 and 7 of the valve casing 1 provide access to the interior of the opposite end of the valve casing and are internally threaded to receive the threaded closure plugs 8 and 8' respectively.

The valve casing 1 intermediate the ends thereof and between the inlets and outlets for hot and cold water is formed with a cylindrical bore 11 constituting a bearing or guide for separate and independently slidable valve plungers 10 and 14, the valve plunger 10 being associated with the control valve for the hot water supply and outlet connection and having a reduced stem portion 10' carrying a valve 10" upon its outer end that is engageable with the valve seat 9 interposed between the hot water inlet 2 and the hot water outlet 4, the plunger valve 10" moving to its seat in a direction inwardly from the adjacent end of the valve casing as illustrated. Devices are provided for limiting the opening movement of the plunger valve 10" and comprise a disk 12 threaded into the open ended connection 6 with a screw 13 working in the screw ring 12 and adjustable when the closure plug 8 is removed in directions toward and away from the plunger valve 10".

The valve plunger 14 sliding in the bearing 11 adjacent the valve plunger 10 is provided upon its outer end with a valve head 14' that seats in an outward direction of movement on the valve seat ring 15 threaded into the valve casing 1 as illustrated, the valve seat ring 15 being adjusted through the open end 7 of the valve casing when the closure plug 8' is removed by a spanner wrench engaging the spanner openings or slots 15′ in the outer side of the valve seat as shown in Figure 3.

Figure 5:
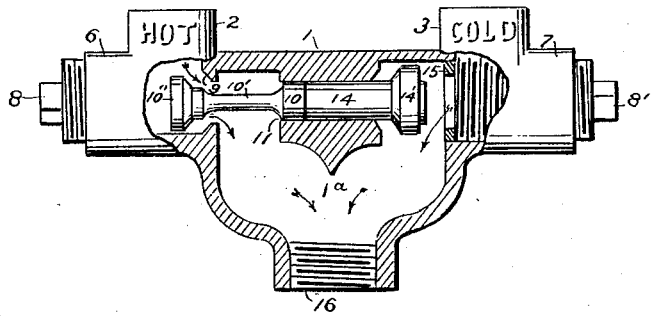
Figure 5 is a side elevational view, partly shown in section of a modified form of the invention, showing a single outlet for the mixing chamber of the mixing valve seat.

The modified form of the invention as illustrated in Figure 5 differs from the showing in Figures 1 to 4 by the provision of a mixing chamber 1a in the valve casing 1 at the outlet side thereof which communicates with a single outlet 16, the construction and operation of this form of the invention being in other respects, similar to the construction and operation of the invention as shown in Figures 1 to 4.

In the operation of the device, hot water is delivered to the valve casing 1 through the hot water inlet connection 2 and the flow of hot water into the valve casing immediately closes the hot water valve 10″ upon its seat 9, this movement shifting the valve plunger 10 in the bearing 11 and engaging the valve plunger 14 to move the plunger valve 14′ onto its seat 15, water failing to flow, by this operation, through the outlet 4.

Cold water is then admitted to the inlet connection 3 and contacting with the plunger valve 14′ opens the same when the required pressure of cold water is obtained and this operation of the cold water supply shifts the valve plunger 14 and valve plunger 10 to open the hot water plunger valve 10″, hot and cold water then flowing through the outlet connections 4 and 5 to a single further supply for consumption, or use. The operation of the valve is of an anti-scalding nature as it is impossible to flow hot water alone through the valve casing in the absence of a supply of cold water flowing therethrough and by adjusting the screw 13 relative to the plunger valve 10″ and the valve seat 15 relative to the plunger valve 14′, the desired temperature of water delivered for use can be attained. It is also possible to vary the temperature of the water by lessening the supply to the inlet connection 2 and increasing the supply of cold water to the inlet connection 3. In the form of the invention shown in Figure 5, the mixing of hot and cold water is accomplished in the valve casing 1 by causing the hot and cold water to mix in the chamber 1a before being delivered to the outlet 16 from the valve casing.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. In an anti-scalding mixing valve for supplying hot and cold water, a valve casing, inlets and outlets at opposite ends of the valve casing for hot and cold water, separate aligned valves for controlling the flow of water through the casing and having end abutting valve stems, said valves closing on their seats in the same direction of movement, the operation of one valve depending upon the operation of the other valve.

2. In an anti-scalding mixing valve for supplying hot and cold water, a valve casing, inlets and outlets at opposite ends of the valve casing for hot and cold water, separate valves for controlling the flow of water through the casing, said valves closing on their seats in the same direction of movement, the operation of one valve depending upon the operation of the other valve, an independent plunger carrying each valve in end to end engagement, and an intermediate bearing in the casing for the adjacent ends of the plungers.

3. In an anti-scalding mixing valve for supplying hot and cold water, a valve casing, inlets and outlets at opposite ends of the valve casing for hot and cold water, separate valves for controlling the flow of water through the casing, said valves closing on their seats in the same direction of movement, the operation of one valve depending upon the operation of the other valve, one of said valve seats being adjustable, and means adjustably movable toward and away from the other valve to be engaged thereby for limiting opening movement of the valves away from their seats.

4. In an anti-scalding mixing valve for supplying hot and cold water, a valve casing, inlets and outlets at opposite ends of the valve casing for hot and cold water, separate valves for controlling the flow of water through the casing, said valves closing on their seats in the same direction of movement, the operation of one valve depending upon the operation of the other valve, a plunger carrying each valve, an intermediate bearing in the casing for the adjacent ends of the plungers, one of said valve seats being adjustable, and means adjustably movable toward and away from the other valve to be engaged thereby for limiting opening movement of the valves away from their seats.

5. In an anti-scalding mixing valve for supplying hot and cold water, a valve casing having open ends and inlets and outlets inwardly of the open ends of the casing for hot and cold water, a longitudinal plunger bearing in the casing intermediate the inlets and outlets, a plunger rod insertible in each open end of the casing for end contact and guided in the bearing, a valve head on the outer end of each plunger rod, a valve seat in the casing for each valve, the hot water valve opening in a direction against the flow of hot water and closure plugs for each open end of the casing.

6. In an anti-scalding mixing valve for supplying hot and cold water, a valve casing having open ends and inlets and outlets inwardly of the open ends of the casing for hot and cold water, a longitudinal plunger bearing in the casing intermediate the inlets and outlets, a plunger rod insertible in each open end of the casing for end contact and guided in the bearing, a valve head on each plunger rod, a valve seat in the casing for each valve, closure plugs for each open end of the casing, and an adjustable member associated with the hot water valve for limiting opening movement thereof under pressure of the cold water valve.

7. In an anti-scalding mixing valve for supplying hot and cold water, a valve casing having open ends and inlets and outlets inwardly of the open ends of the casing for hot and cold water, a longitudinal plunger bearing in the casing intermediate the inlets and outlets, a plunger rod insertible in each open end of the casing and guided in the bearing, a valve head on each plunger rod, a valve seat in the casing for each valve, closure plugs for each open end of the casing, an adjustable member associated with one of the valves for limiting opening movement thereof, and an adjustable valve seat for the other valve.

8. In an anti-scalding mixing valve for supplying hot and cold water, a valve casing having open ends and inlets and outlets inwardly of the open ends of the casing for hot and cold water, a longitudinal plunger bearing in the casing intermediate the inlets and outlets, a plunger rod insertible in each open end of the casing and guided in the bearing, a valve head on each plunger rod, a valve seat in the casing for each valve, closure plugs for each open end of the casing, an adjustable member associated with one of the valves for limiting opening movement thereof, and an adjustable valve seat for the other valve, the adjustable member and adjustable valve seat being operable through the open ends of the casing.

In testimony whereof I affix my signature.

FRANK WALLACE.